United States Patent
Park et al.

(10) Patent No.: US 9,428,033 B2
(45) Date of Patent: Aug. 30, 2016

(54) AIR-CONDITIONING APPARATUS FOR VEHICLE

(71) Applicants: Hyundai Motor Company, Seoul (KR); Kia Motors Corp., Seoul (KR)

(72) Inventors: June Kyu Park, Hwaseong-si (KR); Jae Woo Park, Ansan-si (KR); Man Ju Oh, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 270 days.

(21) Appl. No.: 14/300,909

(22) Filed: Jun. 10, 2014

(65) Prior Publication Data

US 2015/0165865 A1    Jun. 18, 2015

(30) Foreign Application Priority Data

Dec. 18, 2013    (KR) .......................... 10-2013-0158092

(51) Int. Cl.
*F25B 21/02*    (2006.01)
*B60H 1/00*    (2006.01)

(52) U.S. Cl.
CPC ...... *B60H 1/00478* (2013.01); *B60H 1/00285* (2013.01); *B60H 2001/003* (2013.01)

(58) Field of Classification Search
CPC ................ B60H 1/00371; B60H 2001/00235; B60H 1/00479; F25B 21/02
USPC ............................................ 62/3.2, 3.3, 244
See application file for complete search history.

(56) References Cited

FOREIGN PATENT DOCUMENTS

| | | |
|---|---|---|
| JP | 3259430 B2 | 2/2002 |
| JP | 2005-348997 A | 12/2005 |
| JP | 2011-213127 A | 10/2011 |
| JP | 2013-95296 A | 5/2013 |
| KR | 10-2009-0106205 A | 10/2009 |
| KR | 10-2012-0023874 A | 3/2012 |

*Primary Examiner* — Melvin Jones
(74) *Attorney, Agent, or Firm* — Morgan, Lewis & Bockius LLP

(57) ABSTRACT

An air-conditioning apparatus may include an air conditioner that is provided at a rear of a rear seat in the vehicle and includes a thermoelectric element and a blower to produce conditioned air, an inlet duct that connects the air-conditioner to a passenger compartment to introduce air in the passenger compartment into the air-conditioner, an outlet duct that connects the air-conditioner to a roof above the rear seat in the passenger compartment to blow the conditioned air from the roof toward a passenger in the rear seat, and a radiator that is provided at a trunk room to radiate heat from the thermoelectric element.

11 Claims, 2 Drawing Sheets

AIR-CONDITIONING APPARATUS FOR VEHICLE

CROSS REFERENCE TO RELATED APPLICATION

The present application claims priority of Korean Patent Application Number 10-2013-0158092 filed on Dec. 18, 2013, the entire contents of which application are incorporated herein for all purposes by this reference.

BACKGROUND OF INVENTION

1. Field of Invention

The present invention relates to an air-conditioning apparatus for a vehicle that provides optimal air-conditioning for a passenger in a rear seat.

2. Description of Related Art

It is a common problem that the performance of air-conditioning for a passenger in a rear seat (performance of cooling air and a seat) is not satisfactory, especially in premium vehicles.

Conventionally, a system in which air coming from a heater system is blown out to a rear seat through a rear console, or a cooling/heating apparatus having a thermoelectric element inside a rear seat have been employed.

However, in existing air-conditioning apparatuses, cooling air coming from the apparatus fails to reach a rear seat such that direction/volume of breezes are not satisfactory, and a passenger in the rear seat may not feel sufficiently comfortable because of poor performance of a (subsidiary) seat cooling/heating apparatus (poor radiation performance of a thermoelectric element).

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide an air-conditioning apparatus for a vehicle that provides optimal air-conditioning for a passenger in a rear seat.

According to one aspect of the present invention, there is provided an air-conditioning apparatus for a vehicle, including: an air conditioner that is provided in the rear of a rear seat in a vehicle and includes a thermoelectric element and a blower to produce conditioned air; an inlet duct that connects the air-conditioner to the passenger compartment to introduce air in the passenger compartment into the air-conditioner; an outlet duct that connects the air-conditioner to a roof above the rear seat in the passenger compartment to blow conditioned air from the roof toward a passenger in the rear seat; and a radiator that is provided at a trunk room to radiate heat from the thermoelectric element.

The inlet duct may be connected to a bottom of the air-conditioner, and the outlet duct may be connected to a top of the air-conditioner.

On an outlet side of the air-conditioner, the outlet duct may be provided at one side and a drain hole may be provided at another side, and a door may be disposed between the outlet duct and the drain hole may to selectively open and/or close the outlet duct and the drain hole. The drain hole may be connected to the trunk room.

The inlet duct may be connected to seat ventilation ducts installed in the rear seat so that air in the passenger compartment is introduced into the air-conditioner through the rear seat. The inlet duct may be connected to the seat ventilation ducts in a seat cushion and a seat back of the rear seat. The seat ventilation ducts may be channels that penetrate through the seat.

On an outlet side of the air-conditioner, the outlet duct may be provided at one side and a drain hole may be provided at another side, a door may be disposed between the outlet duct and the drain hole may to selectively open and/or close the outlet duct and the drain hole, and when the thermoelectric element is operated, the blower may be operated, and the drain hole may be closed while the outlet duct may be opened by using the door.

On an outlet side of the air-conditioner, the outlet duct may be provided at one side and a drain hole may be provided at another side, a door may be disposed between the outlet duct and the drain hole may to selectively open and/or close the outlet duct and the drain hole, and when the thermoelectric element is not operated, the blower may be operated, and the outlet duct may be closed while the drain hole may be opened by using the door.

The radiator may include radiation fins, a radiation fan, and a cooling line connecting the radiation fins to the thermoelectric element. The cooling line may be a heat pipe line connected to the thermoelectric element.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
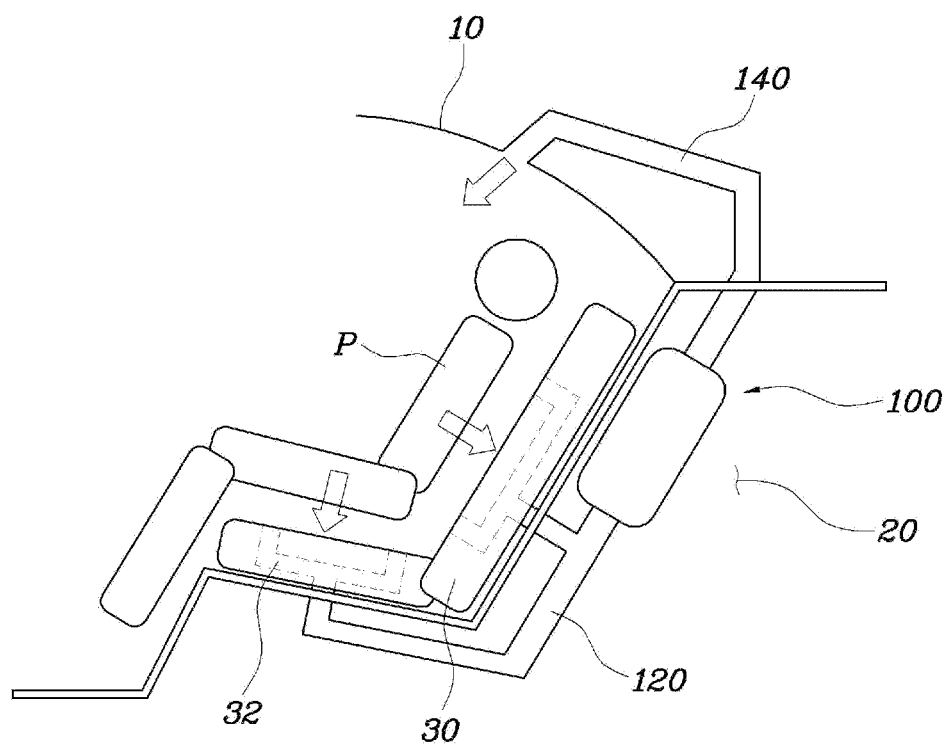
FIG. 1 illustrates an exemplary air-conditioning apparatus for a vehicle according to the present invention.
Figure 2:
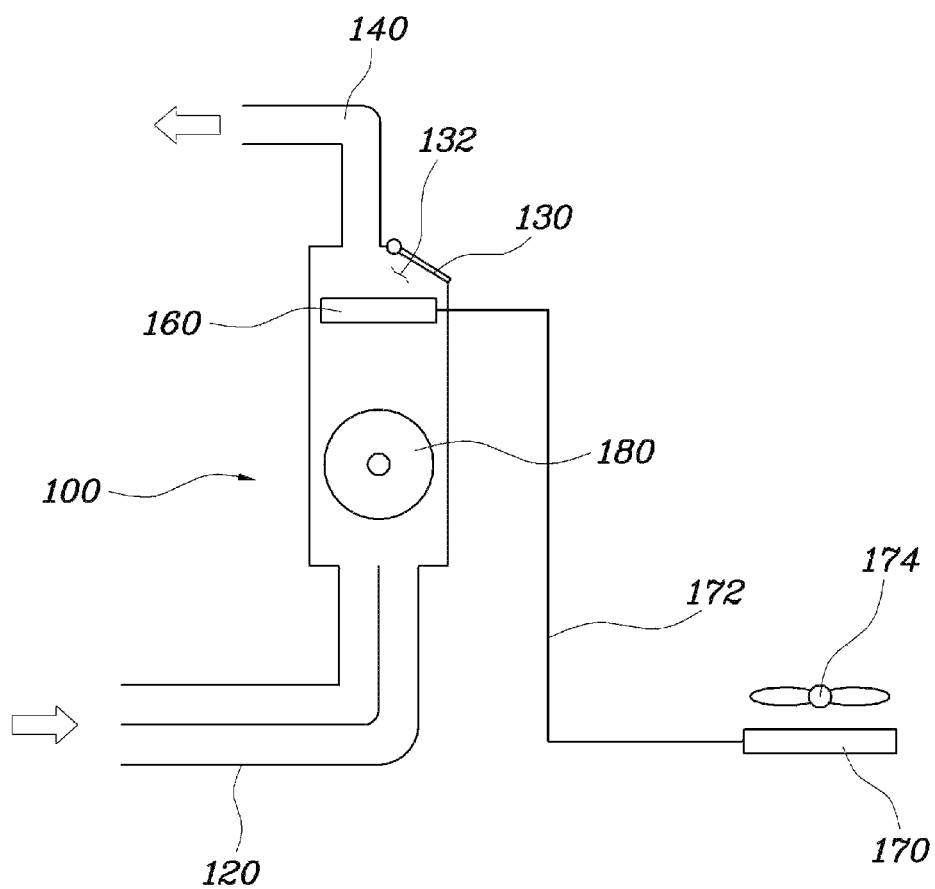
FIG. 2 illustrates an exemplary air-conditioner of an exemplary air-conditioning apparatus for a vehicle according to the present invention.

FIG. 1 illustrates an air-conditioning apparatus for a vehicle and FIG. 2 illustrates an air-conditioner of an air-conditioning apparatus for a vehicle according to various embodiments of the present invention.

The air-conditioning apparatus for a vehicle according to the present invention includes: an air-conditioner 100 that is provided in the rear of a rear seat 30 in a vehicle and includes a thermoelectric element 160 and a blower 180 so as to produce conditioned air; an inlet duct 120 that connects the air-conditioner 100 to a passenger compartment so as to introduce air in the compartment into the air-conditioner 100; an outlet duct 140 that connects the air-conditioner 100 to a roof 10 above the rear seat 30 in the compartment so that the conditioned air is blown from the roof 10 toward a passenger P in the rear seat; and a radiator that is provided at a trunk room 20 so as to radiate heat from the thermoelectric element 160.

As shown in FIG. 1, the air-conditioning apparatus for a vehicle according to the present invention includes the air-conditioner 100 provided at the rear of the rear seat 30 in a vehicle. The air-conditioner 100 may be installed in a trunk room or on a rear package tray, for example. The air-conditioner 100 includes the thermoelectric element 160 and the blower 180 so as to produce conditioned air.

Basically, the air-conditioner 100 introduces air in a passenger compartment thereinto for air-conditioning, and then blows conditioned air. This results in improved efficiency. To this end, the inlet duct 120 connects the air-conditioner 100 to the passenger compartment so as to introduce air in the compartment into the air-conditioner. The outlet duct 140 connects the air-conditioner 100 to the roof 10 above the rear seat 30 in the compartment so that conditioned air is blown from the roof 10 toward the passenger P in the rear seat. Accordingly, the direction and volume of breezes a passenger would feel are more optimized, compared to air-conditioning through a console or the like in the related art.

Further, the thermoelectric element 160 on one hand performs air-conditioning by electric operation and on the other hand discharges heat. For the discharging of heat by the thermoelectric element 160, the radiator is provided in the trunk room 20 such that the radiator radiates heat from the thermoelectric element 160.

Specifically, as shown in FIG. 2, the inlet duct 120 may be connected to the bottom of the air-conditioner 100 and the outlet duct 140 may be connected to the top of the air-conditioner 100. Accordingly, conditioned air is delivered to the roof of a vehicle, and the delivered conditioned air is blown out toward the head of the passenger P. In order to increase the effect of air shower, the breeze volume of the blower 180 may be adjusted so that the passenger's hair is not blown off.

To the outlet side of the air-conditioner 100, the outlet duct 140 is connected on one side and a drain hole 132 is formed on the other side. Between the outlet duct 140 and the drain hole 132, a door 130 is provided so that the outlet duct 140 and the drain hole 132 may be selectively opened and/or closed. Further, the drain hole 132 may be connected to the trunk room 20.

In addition, the inlet duct 120 may be connected to seat ventilation ducts 32 in the rear seat 30 so that air in the compartment is introduced into the air conditioner through the rear seat 30. The inlet duct 120 may be connected to the seat ventilation ducts 32 in the seat cushion and the seat back of the rear seat 30. Specifically, the seat ventilation ducts 32 may be the same as or similar to those used in conventional ventilation seats. However, unlike conventional ventilation seats in which air is blown toward the seat surface, the seat ventilation ducts 32 absorb air from the seat surface to perform air-conditioning, and then blow conditioned air through the roof. That is, the seat ventilation ducts 32 may be channels that penetrate through the seat. With this configuration, a ventilation seat is implemented as well as air-conditioning through a roof is performed.

With overall configurations, when the thermoelectric element 160 is operated, the blower 180 may be operated, and the drain hole 132 may be closed while the outlet duct 140 may be opened by the door 130.

Further, when the thermoelectric element 160 of the air-conditioner 100 is not operated, the blower 180 may be operated, and the outlet duct 140 may be closed while the drain hole 132 may be opened by the door 130. That is, even while air-conditioning through a roof is not performed, the blower 180 is operated for seat ventilation, and absorbed air is blown to the trunk room 20 through the drain hole 132.

The radiator may include radiation fins 170, a radiation fan 174, and a cooling line 172 connecting the radiation fins 170 to the thermoelectric element 160. The cooling line 172 may be a heat pipe connected to the thermoelectric element 160. The heat pipe is a medium that delivers heat at ultrasonic speed, and is connected to the discharging surface of the thermoelectric element to deliver heat to the radiation fins 170 and the radiation fan 174, so that the heat is radiated to the outside.

According to the air-conditioning apparatus thus configured, an air-conditioning system may be compact using a thermoelectric element, and conditioned air is blown from a roof above a rear seat so that the efficiency of air-conditioning is optimized and a passenger feel more comfortable.

Further, the efficiency of air-conditioning is increased since air is introduced through the seat for air conditioning and conditioned air is blown out. Moreover, since both seat ventilation and air-conditioning can be performed with a single configuration, it is efficient and less costly.

For convenience in explanation and accurate definition in the appended claims, the terms "top" or "bottom", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air-conditioning apparatus for a vehicle, comprising:
   an air conditioner that is provided at a rear of a rear seat in the vehicle and includes a thermoelectric element and a blower to produce conditioned air;
   an inlet duct that connects the air-conditioner to a passenger compartment to introduce air in the passenger compartment into the air-conditioner;
   an outlet duct that connects the air-conditioner to a roof above the rear seat in the passenger compartment to blow the conditioned air from the roof toward a passenger in the rear seat; and
   a radiator that is provided at a trunk room to radiate heat from the thermoelectric element.

2. The air-conditioning apparatus of claim 1, wherein the inlet duct is connected to a bottom of the air-conditioner, and the outlet duct is connected to a top of the air-conditioner.

3. The air-conditioning apparatus of claim 1, wherein, on an outlet side of the air-conditioner, the outlet duct is provided at one side and a drain hole is provided at another side, and a door is disposed between the outlet duct and the drain hole to selectively open or close the outlet duct and the drain hole.

4. The air-conditioning apparatus of claim 3, wherein the drain hole is connected to the trunk room.

5. The air-conditioning apparatus of claim 1, wherein the inlet duct is connected to seat ventilation ducts installed in the rear seat so that air in the passenger compartment is introduced into the air-conditioner through the rear seat.

6. The air-conditioning apparatus of claim 5, wherein the inlet duct is connected to the seat ventilation ducts in a seat cushion and a seat back of the rear seat.

7. The air-conditioning apparatus of claim 5, wherein the seat ventilation ducts are channels that penetrate through the seat.

8. The air-conditioning apparatus of claim 5, wherein on an outlet side of the air-conditioner, the outlet duct is provided at one side and a drain hole is provided at another side, wherein a door is disposed between the outlet duct and the drain hole to selectively open or close the outlet duct and the drain hole, and wherein when the thermoelectric element is operated, the blower is operated and the drain hole is closed while the outlet duct is opened by using the door.

9. The air-conditioning apparatus of claim 5, wherein on an outlet side of the air-conditioner, the outlet duct is provided at one side and a drain hole is provided at another side, wherein a door is disposed between the outlet duct and the drain hole to selectively open or close the outlet duct and the drain hole, and wherein when the thermoelectric element is not operated, the blower is operated and the outlet duct is closed while the drain hole is opened by using the door.

10. The air-conditioning apparatus of claim 1, wherein the radiator includes radiation fins, a radiation fan, and a cooling line connecting the radiation fins to the thermoelectric element.

11. The air-conditioning apparatus of claim 10, wherein the cooling line is a heat pipe line connected to the thermoelectric element.

* * * * *